US012627964B2

(12) United States Patent
Roh et al.

(10) Patent No.: US 12,627,964 B2
(45) Date of Patent: May 12, 2026

(54) METHOD OF ESTIMATING THE NUMBER OF BLUETOOTH LOW ENERGY DEVICES IN EXTENDED NEIGHBOR DISCOVERY PROCESS AND APPARATUS THEREOF

(71) Applicant: AJOU UNIVERSITY INDUSTRY-ACADEMIC COOPERATION FOUNDATION, Suwon-si (KR)

(72) Inventors: Byeong-Hee Roh, Seoul (KR); Gaoyang Shan, Suwon-si (KR); Junghyun Lim, Suwon-si (KR)

( * ) Notice: Subject to any disclaimer, the term of this patent is extended or adjusted under 35 U.S.C. 154(b) by 320 days.

(21) Appl. No.: 18/398,212

(22) Filed: Dec. 28, 2023

(65) Prior Publication Data

US 2025/0142313 A1 May 1, 2025

(30) Foreign Application Priority Data

Oct. 27, 2023 (KR) ......................... 10-2023-0145726

(51) Int. Cl.
*H04W 8/00* (2009.01)
*H04L 12/28* (2006.01)
(Continued)

(52) U.S. Cl.
CPC .............. *H04W 8/005* (2013.01); *H04W 4/80* (2018.02)

(58) Field of Classification Search
None
See application file for complete search history.

(56) References Cited

U.S. PATENT DOCUMENTS 8,700,079 B2 * 4/2014 Jovicic .................. H04W 8/005
455/458
9,001,693 B2 * 4/2015 Abraham .............. H04W 84/12
709/227
(Continued)

FOREIGN PATENT DOCUMENTS

KR 10-1614822 4/2016
KR 10-1846985 4/2018

OTHER PUBLICATIONS

English Specification of 10-1846985.
(Continued)

*Primary Examiner* — Tuan A Tran
(74) *Attorney, Agent, or Firm* — ANTONIO HA & U.S. PATENT, LLC

(57) ABSTRACT

Provided are a method of estimating of the number of Bluetooth low energy (BLE) in an extended neighbor discovery process and an apparatus thereof, and a method of estimating the number of extended BLE may receive extended advertising data packets and data packets from a plurality of advertising devices, respectively based on a predetermined cycle, acquire a first candidate value, a second candidate value, and a third candidate value for the number of plural advertising devices based on a first measurement value for the number of extended advertising data packets measured, a second measurement value for the number of data packets measured based on the predetermined cycle, and a third measurement value for the number of advertising devices measured based on the predetermined cycle, and acquire information on the number of plural advertising devices based on information on the number of extended advertising data packets, information on the number of data packets, and information on the number of advertising devices related to the first candidate value, information on the number of extended advertising data
(Continued)

packets, information on the number of data packets, and information on the number of advertising devices related to the second candidate value, and information on the number of extended advertising data packets, information on the number of data packets, and information on the number of advertising devices related to the third candidate value.

18 Claims, 11 Drawing Sheets

(51) Int. Cl.
   H04W 4/80            (2018.01)
   H04W 84/18           (2009.01)

(56)                 References Cited

U.S. PATENT DOCUMENTS

| | | | | |
|---|---|---|---|---|
| 9,232,384 | B2 * | 1/2016 | Chen | H04W 8/005 |
| 9,363,840 | B2 * | 6/2016 | Palin | H04W 8/005 |
| 9,451,436 | B2 * | 9/2016 | Reunamaki | H04W 8/005 |
| 9,686,643 | B2 * | 6/2017 | Viswanadham | H04W 4/02 |
| 9,763,179 | B2 * | 9/2017 | Pragada | H04W 8/005 |
| 9,852,597 | B2 * | 12/2017 | Beaty | H04W 4/80 |
| 9,860,718 | B2 * | 1/2018 | Kumar | H04L 63/123 |
| 9,906,935 | B2 * | 2/2018 | Lee | H04W 8/005 |
| 10,008,087 | B2 * | 6/2018 | Beaty | G08B 21/0294 |
| 10,382,282 | B1 * | 8/2019 | Levy-Yurista | H04W 12/0471 |
| 10,524,199 | B2 * | 12/2019 | Pragada | H04M 15/66 |
| 10,812,993 | B2 * | 10/2020 | Knaappila | H04W 52/0219 |
| 10,887,746 | B2 * | 1/2021 | Wang | H04W 72/20 |
| 10,904,832 | B2 * | 1/2021 | Takeuchi | H04W 84/18 |
| 10,911,930 | B2 * | 2/2021 | Takeuchi | H04W 4/80 |
| 11,212,318 | B2 * | 12/2021 | Mani | H04L 9/3234 |
| 11,490,242 | B2 * | 11/2022 | Qi | H04W 52/0261 |
| 11,696,212 | B2 * | 7/2023 | Heil | H04W 4/80 |
| | | | | 370/328 |
| 11,812,500 | B2 * | 11/2023 | Qi | H04W 52/0261 |
| 12,341,618 | B2 * | 6/2025 | Pragada | H04W 8/22 |
| 12,368,468 | B2 * | 7/2025 | Verma | H04W 8/005 |
| 2019/0327675 | A1 * | 10/2019 | Takeuchi | H04W 76/14 |
| 2020/0084606 | A1 * | 3/2020 | Wang | H04W 4/50 |
| 2021/0211858 | A1 * | 7/2021 | Ellenbeck | H04W 72/0466 |

OTHER PUBLICATIONS

English Specification of 10-1614822.

Bingqing Luo et al. "Performance Analysis Models of BLE Neighbor Discovery: A Survey", IEEE Internet of Things Journal (vol. 8, Issue: 11,Jun. 1, 2021).

Bingqing Luo et al. "Energy Modeling of Neighbor Discovery in Bluetooth low Energy Networks" , Sensors 2019, 19(22), 4997.

* cited by examiner

10

1

METHOD OF ESTIMATING THE NUMBER OF BLUETOOTH LOW ENERGY DEVICES IN EXTENDED NEIGHBOR DISCOVERY PROCESS AND APPARATUS THEREOF

CROSS REFERENCE TO RELATED APPLICATION

This application claims priority from Republic of Korea Patent Application No. 10-2023-0145726, filed on Oct. 27, 2023, which is hereby incorporated by reference in its entirety.

BACKGROUND

Field

The present disclosure relates to a method of estimating the number of Bluetooth low energy (BLE) devices accessing a service in order to provide effective means to design and operate BLE application services.

Related Art

The Bluetooth low energy (BLE) standard defines 40 communication channels. Of these, three basic advertising channels #37, #38, and #39 are used as an advertising event that transmits protocol data units (PUDs). The remaining secondary channels #0 to #36 are used as data channels for data transfer. Advertising devices periodically broadcast the advertising events, and scanners receive the advertising events, so the scanners can recognize the advertising devices. Such a process is called a neighbor discovery process (NDP).

In the BLE 4.x standard, the neighbor discovery process is performed by using only the advertising event, and this is called a basic neighbor discovery process (B-NDP). In the B-NDP, as the number of advertising devices increases, the number of advertising packets transmitted by the advertising device increases, so a possibility of collision between advertising packets increases. As a result, a probability that the scanner will recognize the advertising device is reduced, which can cause problems in providing smooth services.

From the BLE 5.0 standard, a neighbor discovery process is presented, which uses an extended advertising event which is an extended version of the basic advertising event in order to complement the problems of the basic neighbor discovery process. This is called an extended neighbor discovery process (E-NDP). Advertising devices which use the E-NDP periodically broadcast extended advertising data packets to channels #37, #38, and #39 with respect to the advertising event without designating another device as a specific receiving target. The extended advertising data packet includes a channel number and transmission time information for transmission of the data packet. The scanner can recognize the advertising device by acquiring data by receiving the data packet in a channel and at a cycle designated based on the extended advertising data packet.

SUMMARY

The present disclosure provides creation of an environment which can increase an advertising device recognition probability of a scanner by reducing an inter-packet collision possibility generated as the number of transmitted extended advertising packets increases due to an increase in number of advertising devices.

The present disclosure also provides creation of an environment in which by reducing an inter-packet collision possibility generated as the number of transmitted extended advertising packets increases due to an increase in number of advertising devices, an Internet of things (IoT) application scanner using an extended neighbor discovery process smoothly recognizes the advertising device to provide a service desired by a user.

In an aspect, provided is a method of estimating the number of extended BLE, which may include: receiving extended advertising data packets and data packets from a plurality of advertising devices, respectively based on a predetermined cycle; acquiring a first candidate value, a second candidate value, and a third candidate value for the number of plural advertising devices based on a first measurement value for the number of extended advertising data packets measured, a second measurement value for the number of data packets measured based on the predetermined cycle, and a third measurement value for the number of advertising devices measured based on the predetermined cycle; and acquiring information on the number of plural advertising devices based on information on the number of extended advertising data packets, information on the number of data packets, and information on the number of advertising devices related to the first candidate value, information on the number of extended advertising data packets, information on the number of data packets, and information on the number of advertising devices related to the second candidate value, and information on the number of extended advertising data packets, information on the number of data packets, and information on the number of advertising devices related to the third candidate value.

In another aspect, provided is an apparatus of estimating the number of extended BLE, which include: a processor; and a memory storing one or more commands performed by the processor, in which the one or more commands may include receiving extended advertising data packets and data packets from a plurality of advertising devices, respectively based on a predetermined cycle; acquiring a first candidate value, a second candidate value, and a third candidate value for the number of plural advertising devices based on a first measurement value for the number of extended advertising data packets measured, a second measurement value for the number of data packets measured based on the predetermined cycle, and a third measurement value for the number of advertising devices measured based on the predetermined cycle; and acquiring information on the number of plural advertising devices based on information on the number of extended advertising data packets, information on the number of data packets, and information on the number of advertising devices related to the first candidate value, information on the number of extended advertising data packets, information on the number of data packets, and information on the number of advertising devices related to the second candidate value, and information on the number of extended advertising data packets, information on the number of data packets, and information on the number of advertising devices related to the third candidate value.

In yet another aspect, provided is a system of estimating the number of extended BLE, which may include: a data package acquisition apparatus acquiring extended advertising data packets and data packets; and an extended BLE number estimation apparatus receiving the extended advertising data packets and the data packets processed by the data packet acquisition apparatus, and estimating the number of plural advertising device, in which the extended BLE number estimation apparatus may receive extended advertising data packets and data packets from a plurality of advertising devices, respectively based on a predetermined cycle, acquire a first candidate value, a second candidate value, and a third candidate value for the number of plural advertising devices based on a first measurement value for the number of extended advertising data packets measured, a second measurement value for the number of data packets measured based on the predetermined cycle, and a third measurement value for the number of advertising devices measured based on the predetermined cycle, and acquire information on the number of plural advertising devices based on information on the number of extended advertising data packets, information on the number of data packets, and information on the number of advertising devices related to the first candidate value, information on the number of extended advertising data packets, information on the number of data packets, and information on the number of advertising devices related to the second candidate value, and information on the number of extended advertising data packets, information on the number of data packets, and information on the number of advertising devices related to the third candidate value.

According to exemplary embodiments of the present disclosure, the number of advertising devices can be estimated, which access an environment in which an application service such as the Internet of things using an extended NDP (E-NDP) of BLE standard 5.x is in progress.

According to exemplary embodiments of the present disclosure, the number of advertising devices is estimated, which receive a service by accessing the application service using the extended neighbor discovery process which is currently operated to determine whether to provide a desired level customized service, and from this, BLE parameters for effective application service providing can be set.

4 neighbor discovery process according to another exemplary embodiment of the present disclosure.

DESCRIPTION OF EXEMPLARY EMBODIMENTS

Hereinafter, exemplary embodiments of the present disclosure will be described in detail with reference to drawings. However, a detailed description of publicly-known function and configuration that may make the gist of the present disclosure will be omitted in the following description and the accompanying drawings. Throughout the specification, unless explicitly described to the contrary, the word "comprise" and variations such as "comprises" or "comprising" will be understood to imply the inclusion of stated elements but not the exclusion of any other elements.

Further, terms including as first, second, and the like are used for describing various components, but the components are not limited by the terms. The terms may be used only for distinguishing one component from the other component. For example, a first component may be named as a second component and, similarly, the second component may also be named as the first component without departing from the scope of the present disclosure.

Terms used in the present disclosure are used only to describe specific exemplary embodiments, and are not intended to limit the present disclosure. A singular form includes a plural form if there is no clearly opposite meaning in the context. In the present disclosure, it should be understood that the term "include" or "have" indicates that a feature, a number, a step, an operation, a component, a part or the combination thereof described in the specification is present, but does not exclude a possibility of the presence or addition of one or more other features, numbers, steps, operations, components, parts or combinations thereof, in advance.

If it is not contrarily defined, all terms used herein including technological or scientific terms have the same meanings as those generally understood by a person with ordinary skill in the technical field to which the present disclosure pertains. Terms which are defined in a generally used dictionary should be interpreted to have the same meaning as the meaning in the context of the related art, and are not interpreted as ideal meanings or excessively formal meanings unless clearly defined in the present disclosure.

Figure 1:
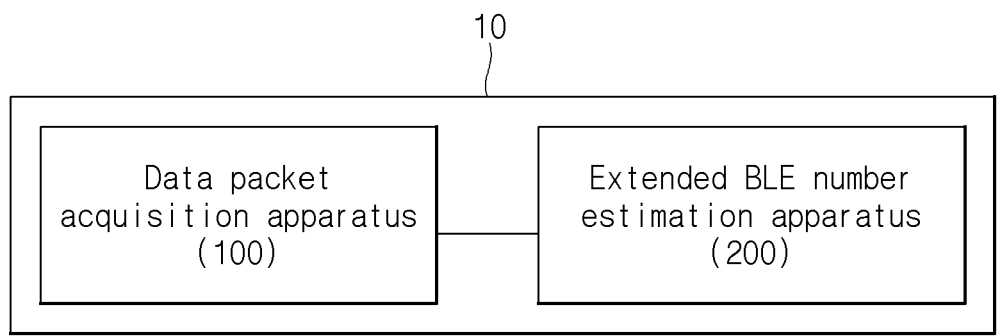
FIG. 1 is a block diagram illustrating a system of estimating the number of extended BLE in an extended neighbor discovery process according to an exemplary embodiment of the present disclosure.
Figure 2A:
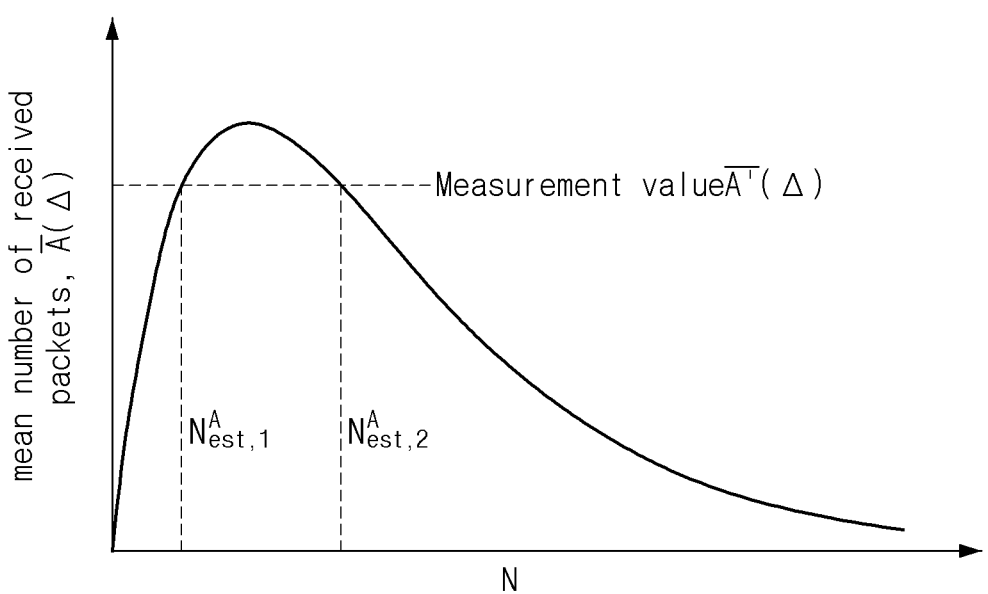
FIGS. 2A to 2B are diagrams for describing a method of acquiring a first candidate value according to an exemplary embodiment of the present disclosure.
Figure 2B:
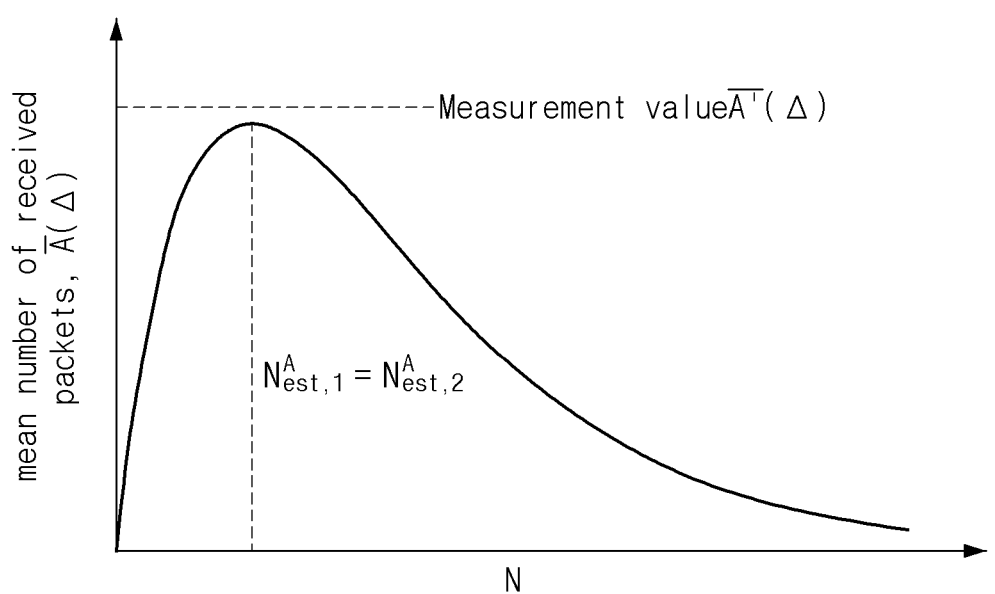
Figure 3A:
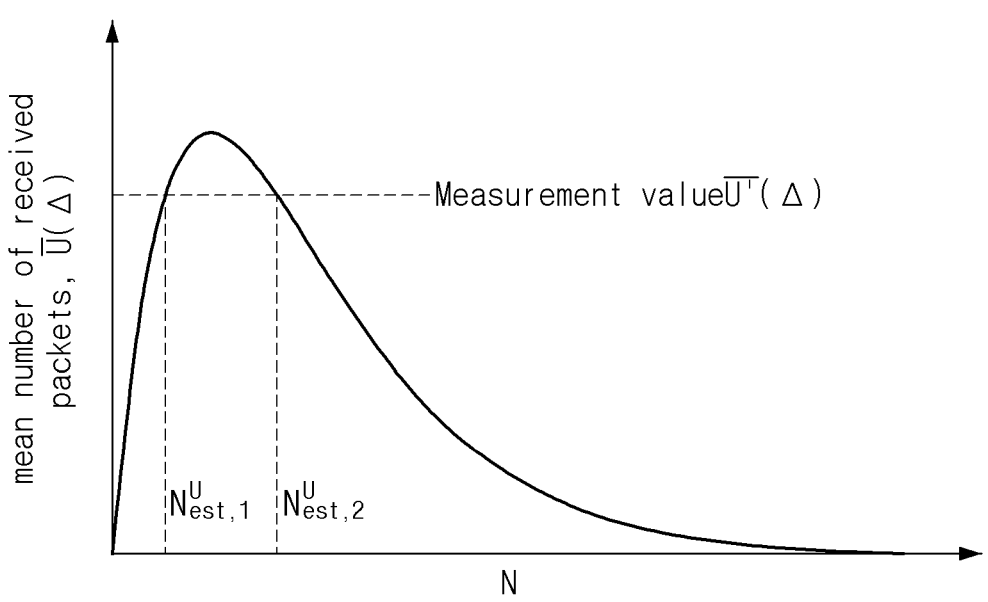
FIGS. 3A to 3B are diagrams for describing a method of acquiring a second candidate value according to an exemplary embodiment of the present disclosure.
Figure 3B:
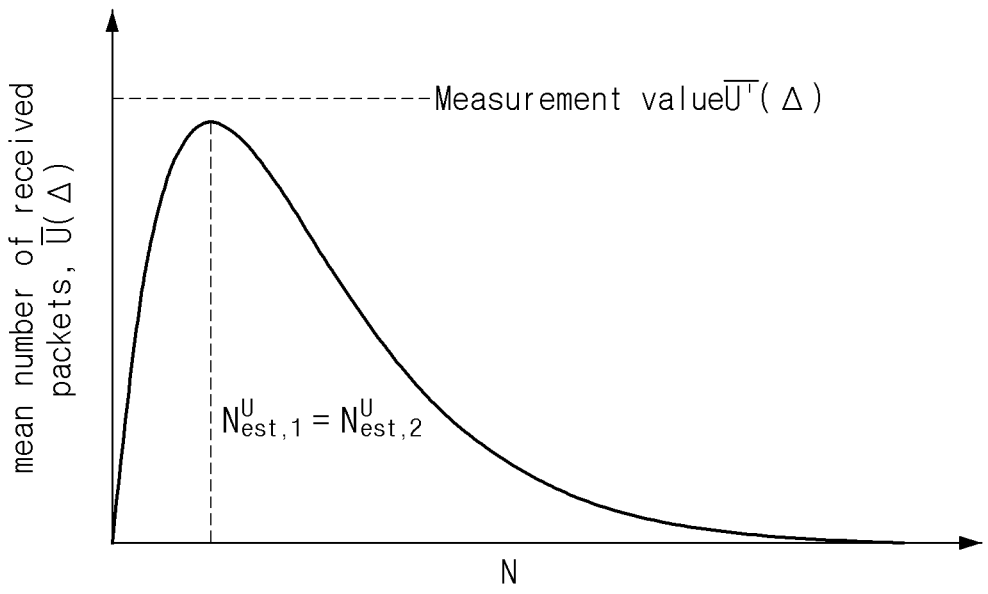
Figure 4A:
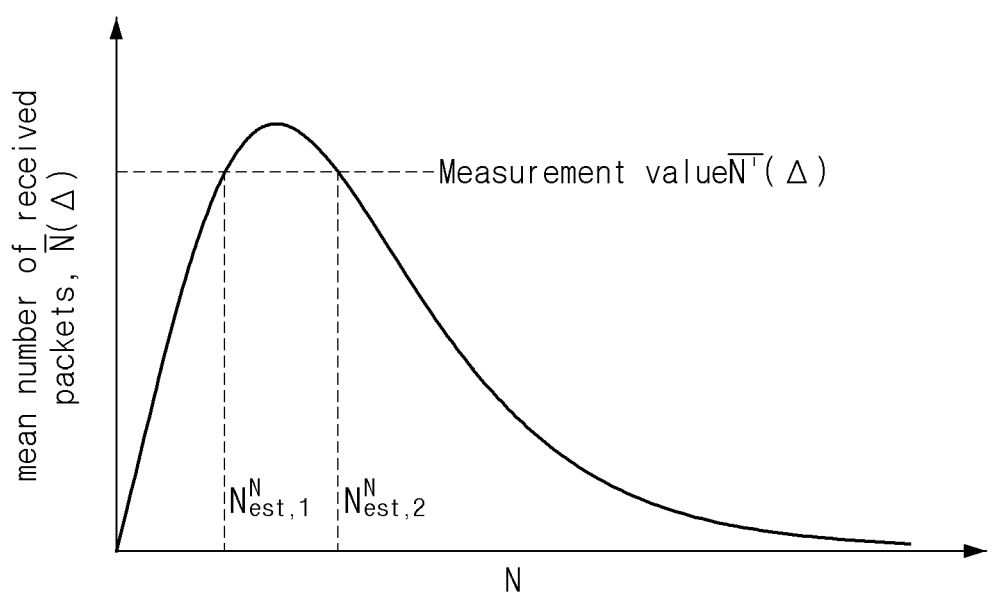
FIGS. 4A to 4B are diagrams for describing a method of acquiring a third candidate value according to an exemplary embodiment of the present disclosure.
Figure 4B:
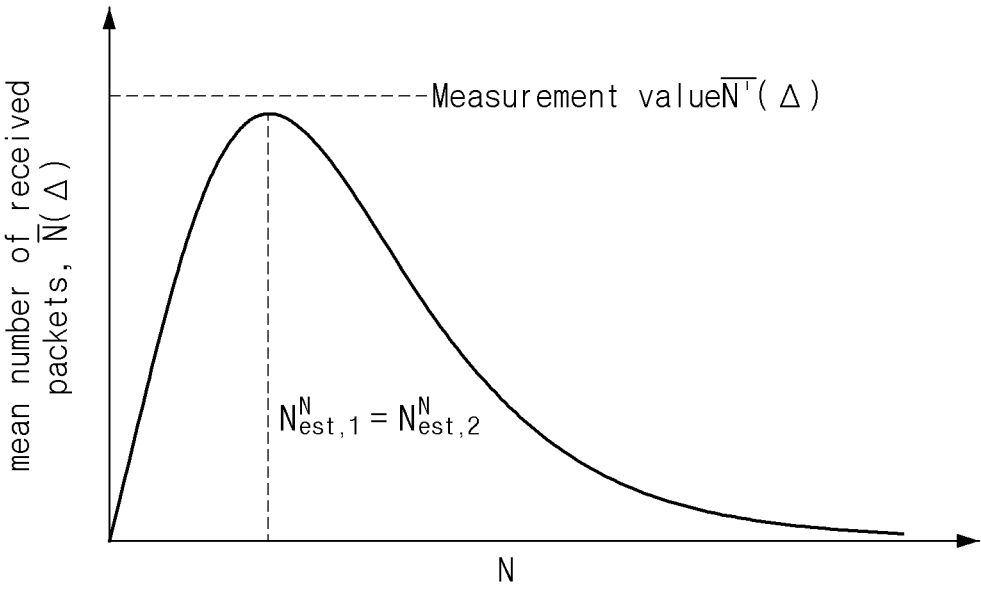

FIG. 1 is a block diagram illustrating a system of estimating the number of extended BLE in an extended neighbor discovery process according to an exemplary embodiment of the present disclosure. FIGS. 2A to 2B are diagrams for describing a method of acquiring a first candidate value according to an exemplary embodiment of the present disclosure. FIGS. 3A to 3B are diagrams for describing a method of acquiring a second candidate value according to an exemplary embodiment of the present disclosure. FIGS. 4A to 4B are diagrams for describing a method of acquiring a third candidate value according to an exemplary embodiment of the present disclosure.

Referring to FIG. 1, a system 10 of estimating the number of extended BLE according to an exemplary embodiment of the present disclosure may include a data packet acquisition apparatus 100 and an extended BLE number estimation apparatus 200.

The data packet acquisition apparatus 100 may acquire extended advertising data packets and data packets received from a plurality of advertising devices, respectively. The data packet acquisition apparatus 100 may transmit the extended advertising data packets and the data packets to the extended BLE number estimation apparatus 200.

The extended BLE number estimation apparatus 200 may receive the extended advertising data packets and the data packets from the data packet acquisition apparatus 100. The extended BLE number estimation apparatus 200 may receive the extended advertising data packets and the data packets from a plurality of advertising devices, respectively based on a predetermined cycle. The extended BLE number estimation apparatus 200 may acquire a first candidate value, a second candidate value, and a third candidate value for the number of plural advertising devices based on a first measurement value for the number of extended advertising data packets measured based on a predetermined cycle, a second measurement value for the number of data packets measured based on a predetermined cycle, and a third measurement value for the number of advertising devices measured based on a predetermined cycle.

Referring to FIGS. 2A, 2B, 3A, 3B, 4A, and 4B, the plurality of advertising devices may access a scanner in a short-range communication environment. Here, the short-range communication environment may be a BLE 5.0 standard communication environment, and the number of plural advertising devices may be N, and the scanner may be separately provided in the extended BLE number estimation system 10. In general, the extended BLE number estimation system 10 may receive the extended advertising data packets and the data packets from the plurality of advertising devices, and the numbers of extended advertising data packets and the number of data packets may be different from the number of plural advertising devices.

For example, the extended advertising data packet may be ADV_EXT_IND, and the data packet may be AUX_ADV_IND. When the number of extended advertising data packets which the scanner successfully measures during a predetermined cycle $\tau$ ($\tau \geq T_{AP}$) is $\overline{A}(\tau)$, the measured number of data packets is $\overline{U}(\tau)$, and the measured number of advertising devices is $\overline{N}(\tau)$, the numbers are shown in Equations 1, 2, and 3, respectively.

$$\overline{A}(\tau) = N\frac{\tau}{T_{AP}}\left(1 - \frac{2T_{ADV}}{T_{AP}}\right)^{N-1} \qquad \text{[Equation 1]}$$

$$\overline{U}(\tau) = \qquad \text{[Equation 2]}$$
$$N\frac{\tau}{KT_{AP}}\left(1 - \left(1 - \left(1 - \frac{2T_{ADV}}{T_{AP}}\right)^{N-1}\right)^K\right)\left(1 - \frac{2T_{AUX}}{MKT_{AP}}\right)^{N-1}$$

$$\overline{N}(\tau) = \qquad \text{[Equation 3]}$$
$$N\left(1 - \left(1 - \left(1 - \left(1 - \frac{2T_{ADV}}{T_{AP}}\right)^{N-1}\right)^K\right)\left(1 - \frac{2T_{AUX}}{MKT_{AP}}\right)^{N-1}\right)^{\frac{\tau}{KT_{AP}}}$$

Referring to Equations 1 to 3, M means the number of channels capable of transmitting and receiving data packets. For example, when is 37, $\overline{A}(\tau)$, $\overline{U}(\tau)$, and $\overline{N}(\tau)$ may be a concave function type having N which is the plurality of advertising devices as a variable.

Referring to FIG. 2A, the extended BLE number estimation apparatus 200 may set a cycle $\Delta (\Delta \geq T_{AP})$ of measuring the extended advertising data packets. Here, the extended advertising data packets may be received by the scanner.

The extended BLE number estimation apparatus 200 may acquire the first measurement value $\overline{A}'(\Delta)$ for the number of extended advertising data packets which the scanner successfully measures during the predetermined cycle $\Delta$. The extended BLE number estimation apparatus 200 may acquire the first measurement value based on Equation 4 below.

$$\overline{A}'(\Delta) = N\frac{\Delta}{T_{AP}}\left(1 - \frac{2T_{ADV}}{T_{AP}}\right)^{N-1} \qquad \text{[Equation 4]}$$

The extended BLE number estimation apparatus 200 may acquire a plurality of N values which satisfy the first measurement value. For example, the plurality of N values may include $$N_{est,1}^A \text{ and } N_{est,2}^B,$$

but is not limited thereto. Further, the extended BLE number estimation apparatus 200 may acquire the first candidate value based on the plurality of N values. In this case, the first candidate value may include $\tilde{N}_1$ and $\tilde{N}_2$, but is not limited thereto.

Referring to FIG. 2B, meanwhile, when the first measurement value is the maximum, the value N which satisfies Equation 4 may not be present. In this case, the extended BLE number estimation apparatus 200 may acquire an value which satisfies a maximum value of the first measurement value. That is, $$N_{est,1}^A \text{ and } N_{est,2}^B$$

may be equal to each other. The extended BLE number estimation apparatus 200 may acquire the first candidate value based on the value.

Referring to FIG. 3A, the extended BLE number estimation apparatus 200 may set a cycle $\Delta(\Delta \geq T_{AP})$ of measuring the data packets. Here, the data packets may be received by the scanner.

The extended BLE number estimation apparatus 200 may acquire the second measurement value $\overline{U}'(\Delta)$ for the number of data packets which the scanner successfully measures during the predetermined cycle $\Delta$. The extended BLE number estimation apparatus 200 may acquire the second measurement value based on Equation 5 below.

$$\overline{U}'(\Delta) = \qquad \text{[Equation 5]}$$
$$N\frac{\Delta}{KT_{AP}}\left(1 - \left(1 - \left(1 - \frac{2T_{ADV}}{T_{AP}}\right)^{N-1}\right)^K\right)\left(1 - \frac{2T_{AUX}}{MKT_{AP}}\right)^{N-1}$$

The extended BLE number estimation apparatus 200 may acquire a plurality of N values which satisfy the second measurement value. For example, the plurality of values may include $$N_{est,1}^U \text{ and } N_{est,2}^U,$$

but is not limited thereto. Further, the extended BLE number estimation apparatus 200 may acquire the second candidate value based on the plurality of N values. In this case, the second candidate value may include $\tilde{N}_3$ and $\tilde{N}_4$, but is not limited thereto.

Referring to FIG. 3B, meanwhile, when the second measurement value is the maximum, the value N which satisfies Equation 5 may not be present. In this case, the value which satisfies a extended BLE number estimation apparatus 200 may acquire a maximum value of the second measurement value. That is, $$N_{est,1}^{U} \text{ and } N_{est,2}^{U}$$

may be equal to each other. The extended BLE number estimation apparatus 200 may acquire the second candidate value based on the N value.

Referring to FIG. 4A, the extended BLE number estimation apparatus 200 may set a cycle $\Delta(\Delta \geq T_{AP})$ of measuring the advertising devices. Here, the advertising devices may be received by the scanner.

The extended BLE number estimation apparatus 200 may acquire the third measurement value $\overline{N}'(\Delta)$ for the number of advertising devices which the scanner successfully measures during the predetermined cycle $\Delta$. The extended BLE number estimation apparatus 200 may acquire the third measurement value based on Equation 6 below.

$$\overline{N}'(\Delta) = N \left( 1 - \left( 1 - \left( 1 - \left( 1 - \frac{2T_{ADV}}{T_{AP}} \right)^{N-1} \right)^{K} \right) \left( 1 - \frac{2T_{AUX}}{MKT_{AP}} \right)^{N-1} \right)^{\frac{\Delta}{KT_{AP}}} \right) \qquad \text{[Equation 6]}$$

The extended BLE number estimation apparatus 200 may acquire a plurality of N values which satisfy the third measurement value. For example, the plurality of N values may include $$N_{est,1}^{N} \text{ and } N_{est,2}^{N},$$

but is not limited thereto. Further, the extended BLE number estimation apparatus 200 may acquire the third candidate value based on the plurality of N values. In this case, the third candidate value may include $\tilde{N}_5$ and $\tilde{N}_6$, but not limited thereto.

Referring to FIG. 4B, meanwhile, when the third measurement value is the maximum, the value which satisfies Equation 6 may not be present. In this case, the extended BLE number estimation apparatus 200 may acquire a N value which satisfies a maximum value of the third measurement value. That is, $$N_{est,1}^{N} \text{ and } N_{est,2}^{N}$$

may be equal to each other. The extended BLE number estimation apparatus 200 may acquire the third candidate value based on the value. That is, the possible number of total candidate values acquired by adding the first candidate value, the second candidate value, and the third candidate value may be one of 3, 4, 5, and 6.

The extended BLE number estimation apparatus 200 may acquire information $\overline{A}_1(\Delta)$ $\overline{A}_2(\Delta)$ on the number of extended advertising data packets related to the first candidate and value, information $\overline{U}_1(\Delta)$ and $\overline{U}_2(\Delta)$ on the number of data packets related to the first candidate value, and information $\overline{N}_1(\Delta)$ and $\overline{N}_2(\Delta)$ on the number of advertising devices related to the first candidate value, information $\overline{A}_3(\Delta)$ and $\overline{A}_4(\Delta)$ on the number of extended advertising data packets related to the second candidate value, information $\overline{U}_3(\Delta)$ and $\overline{U}_4(\Delta)$ on the number of data packets related to the second candidate value, and information $\overline{N}_3(\Delta)$ and $\overline{N}_4(\Delta)$ on the number of advertising devices related to the second candidate value, and information $\overline{A}_5(\Delta)$ and $\overline{A}_6(\Delta)$ on the number of extended advertising data packets related to the third candidate value, information $\overline{U}_5(\Delta)$ and $\overline{U}_6(\Delta)$ on the number of data packets related to the third candidate value, and information $\overline{N}_5(\Delta)$ and $\overline{N}_6(\Delta)$ on the number of advertising devices related to the third candidate value. In this case, respective information, may include specified detailed values, but is not limited thereto.

The extended BLE number estimation apparatus 200 may acquire information $\overline{A}_i(\Delta)$ on the number of extended advertising data packets, information $\overline{U}_i(\Delta)$ on the number of data packets, and information $\overline{N}_i(\Delta)$ on the number of advertising devices based on the first candidate value, the second candidate value, and the third candidate value. The extended BLE number estimation apparatus 200 may acquire information $\overline{A}_i(\Delta)$ on the number of extended advertising data packets, information $\overline{U}_i(\Delta)$ on the number of data packets, and information $\overline{N}_i(\Delta)$ on the number of advertising devices through the Equations 1 to 3, respectively. The extended BLE number estimation apparatus 200 may acquire the information on the number of extended advertising data packets. The information on the number of extended advertising data packets may be the information on the number of extended advertising data packets related to the first candidate value, the second candidate value, and the third candidate value.

The extended BLE number estimation apparatus 200 may acquire the information on the number of data packets. The information on the number of data packets may be the information on the number of extended advertising data packets related to the first candidate value, the second candidate value, and the third candidate value.

The extended BLE number estimation apparatus 200 may acquire the information on the number of advertising devices. The information on the number of extended advertising data packets may be the information on the number of extended advertising data packets related to the first candidate value, the second candidate value, and the third candidate value.

The extended BLE number estimation apparatus 200 may acquire the information on the number of extended advertising data packets based on Equation 7 below, acquire the information on the number of data packets based on Equation 8 below, and acquire the information on the number of advertising devices based on Equation 9 below.

$$\overline{A}_i(\Delta) = \tilde{N}_i \frac{\Delta}{T_{AP}} \left( 1 - \frac{2T_{ADV}}{T_{AP}} \right)^{\tilde{N}_i - 1} \qquad \text{[Equation 7]}$$

$$\overline{U}_i(\Delta) = \qquad \text{[Equation 8]}$$
$$\tilde{N}_i \frac{\Delta}{KT_{AP}} \left( 1 - \left( 1 - \left( 1 - \frac{2T_{ADV}}{T_{AP}} \right)^{\tilde{N}_i - 1} \right)^{K} \right) \left( 1 - \frac{2T_{AUX}}{MKT_{AP}} \right)^{\tilde{N}_i - 1}$$

$$\overline{N}_i(\Delta) = \tilde{N}_i \left( 1 - \qquad \text{[Equation 9]} \right.$$

9
-continued $$\left(1-\left(1-\left(1-\left(1-\frac{2T_{ADV}}{T_{AP}}\right)^{\tilde{N}_i-1}\right)^K\right)\left(1-\frac{2T_{AUX}}{MKT_{AP}}\right)^{\tilde{N}_i-1}\right)^{\frac{\Delta}{KT_{AP}}}\right)$$

The extended BLE number estimation apparatus 200 may acquire a first summation value through Equation 10 below based on the information on the number of extended advertising data packets, the information on the number of data packets, and the information on the number of advertising devices related to the first candidate value, and the first measurement value, the second measurement value, and the third measurement value. The extended BLE number estimation apparatus 200 may acquire a second summation value through Equation 10 below based on the information on the number of extended advertising data packets, the information on the number of data packets, and the information on the number of advertising devices related to the second candidate value, and the first measurement value, the second measurement value, and the third measurement value. The extended BLE number estimation apparatus 200 may acquire a third summation value through Equation 10 below based on the information on the number of extended advertising data packets, the information on the number of data packets, and the information on the number of advertising devices related to the third candidate value, and the first measurement value, the second measurement value, and the third measurement value. In this case the first summation value may include $d_1$ and $d_2$, but is not limited thereto, and the second summation value may include $d_3$ and $d_4$, but is not limited thereto, and the third summation value may include $d_5$ and $d_6$, but is not limited thereto.

$$d_i = \frac{|\overline{A}_i(\Delta)-\overline{A}'(\Delta)|}{\overline{A}'(\Delta)} + \frac{|\overline{U}_i(\Delta)-\overline{U}'(\Delta)|}{\overline{U}'(\Delta)} + \frac{|\overline{N}_i(\Delta)-\overline{N}'(\Delta)|}{\overline{N}'(\Delta)} \quad \text{[Equation 10]}$$

The extended BLE number estimation apparatus 200 acquires a relative error value $d_i$ based on an absolute difference value among the first summation value, the second summation value, and the third summation value to acquire information on the number of plural advertising devices.

The extended BLE number estimation apparatus 200 may further enhance the accuracy of the information on the number of plural advertising devices as a relative error value acquired when i showing that the relative error value is the smallest is $n^*$, $n^*$ may be acquired through Equation 11 below.

$$n^* = \arg\min_{1\le i\le 6}\{d_i\}, \quad \text{[Equation 11]}$$

In Equation 11, $\arg\min_i f(i)$ means a factor in which $f(i)$ is the minimum, and the information $\tilde{N}$ on the number of plural advertising devices finally acquired by the extended BLE number estimation apparatus 200 may be shown in Equation 12 below.

$$\tilde{N} = \tilde{N}_{n^*} \quad \text{[Equation 12]}$$

Figure 5:
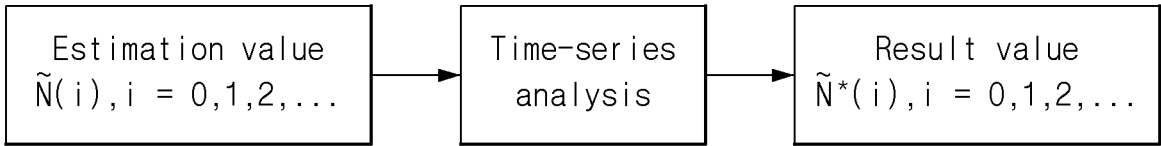
FIG. 5 is a flowchart chart in which time-series analysis is applied to a method of estimating the number of extended BLE in an extended neighbor discovery process according to an exemplary embodiment of the present disclosure.
Figure 6:
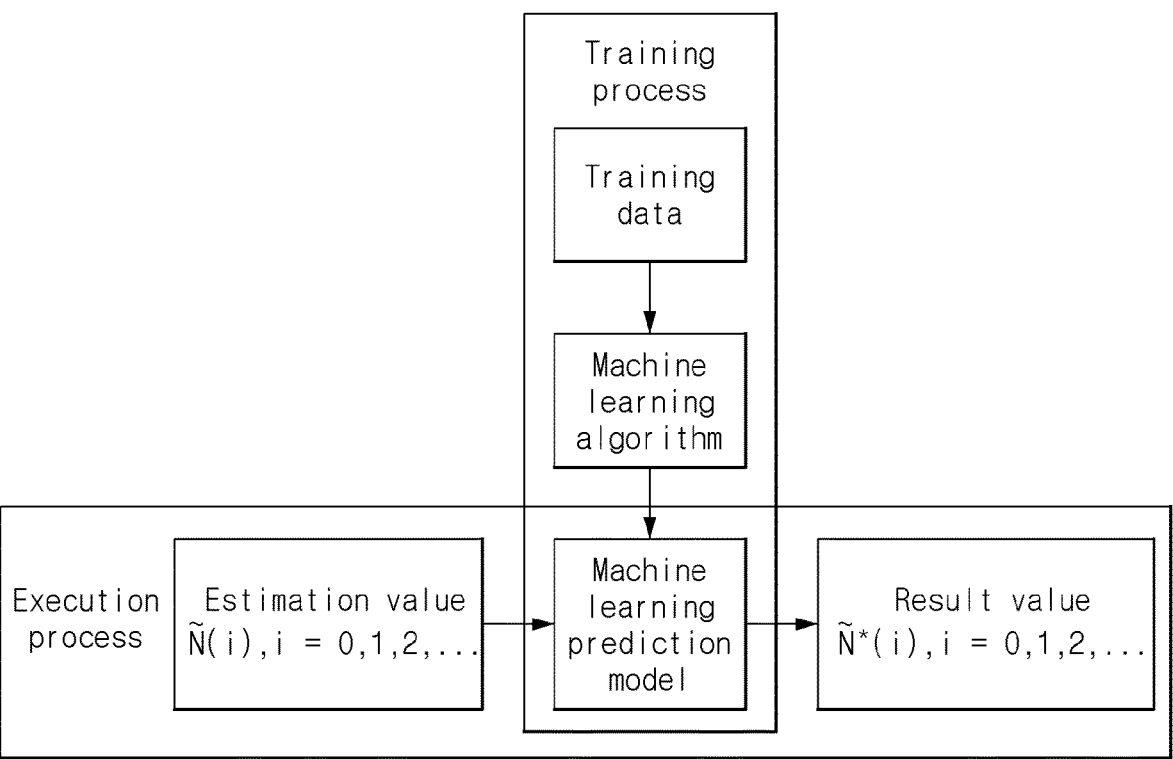
FIG. 6 is a flowchart chart in which artificial intelligence analysis is applied to the method of estimating the number of extended BLE in the extended neighbor discovery process according to an exemplary embodiment of the present disclosure.

FIG. 5 is a flowchart chart in which time-series analysis is applied to a method of estimating the number of extended BLE in an extended neighbor discovery process according to an exemplary embodiment of the present disclosure. FIG. 6 is a flowchart chart in which artificial intelligence analysis is applied to the method of estimating the number of extended BLE in the extended neighbor discovery process according to an exemplary embodiment of the present disclosure.

FIG. 4 is a flowchart in which a time-series analysis method is applied to estimation of the number of extended BLE in order to statistically process values measured at a plurality of predetermined cycles in order to correct an estimation value of the information on the number of plural advertising devices. FIG. 5 is a flowchart in which a pre-trained artificial intelligence model is used in estimating the number of extended BLE in order to correct the information on the number of instantaneous plural advertising devices.

The above-described method may provide a method of acquiring the estimation value of the information on the number of instantaneous plural advertising devices during the predetermined cycle $\Delta$. However, in a short-range wireless communication environment, the information on the number of plural advertising devices which the extended BLE number estimation apparatus (e.g., the extended BLE number estimation apparatus 200 of FIG. 1) acquires may be changed due to a surrounding building environment and interference between other signals.

Referring to FIG. 5, when information on the number of plural advertising devices estimated during the predetermined cycle $\Delta$ at a time $t_i$, (i=0, 1, 2, . . . ) is $\tilde{N}(i)$, the extended BLE number estimation apparatus to which the time-series analysis method is applied may acquire a statistically processed result value $\tilde{N}_i^*(i)$. For example, the applied time-series analysis method may be an exponentially weighted moving average (EWMA). The EWMA is a scheme that acquires a value averagely approximated from values which are changed over time. When the statistically processed result value $\tilde{N}_i^*(i)$ is a value acquire at the time by using the time-series analysis method, a result value $\tilde{N}_i^*(i)$ statistically processed through Equation 13 below may be acquired from an estimation value $\tilde{N}_i^*(i)$ estimated at each time.

$$\tilde{N}^*(i) = \alpha\tilde{N}(i) + (1-\alpha)\tilde{N}^*(i-1), i \ge 1, \quad \text{[Equation 13]}$$

In Equation 13, $\alpha$ may be a real number value between 0 and 1, and $\tilde{N}_i^*(0)$ may be equal to $\tilde{N}(0)$.

Referring to FIG. 6, the artificial intelligence analysis method may be constituted by a training process of training an artificial intelligence model in advance and an execution process of predicting an estimation value of the information on the number of plural advertising devices by using the artificial intelligence model trained in advance. Training data of the artificial intelligence model may adopt estimation values $\tilde{N}_i^*(i)$ acquired through the information on the number of plural adverting devices in each of predetermined BLE.5x environments. In the execution process, estimation values $\tilde{N}_i^*(i)$ actually measured through the extended BLE number estimation apparatus are used as an input value of the artificial intelligence model to acquire an output value $\tilde{N}_i^*(i)$ acquired by outputting the information on the number of plural advertising devices.

Figure 7:
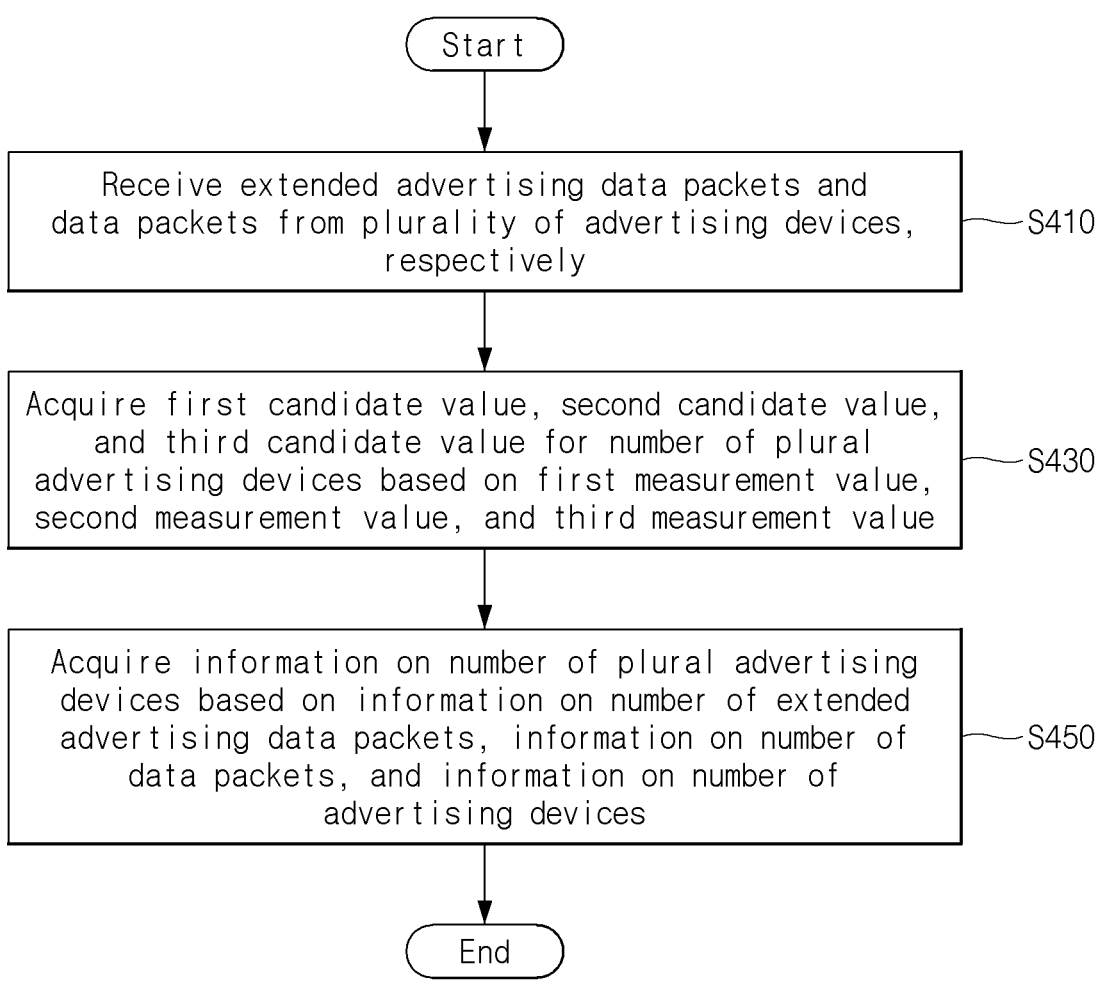
FIG. 7 is a flowchart illustrating a method of estimating the number of extended BLE in an extended neighbor discovery process according to an exemplary embodiment of the present disclosure.

FIG. 7 is a flowchart illustrating a method of estimating the number of extended BLE in an extended neighbor discovery process according to an exemplary embodiment of the present disclosure.

Referring to FIG. 7, the extended BLE number estimation apparatus may receive the extended advertising data packets and the data packets from a plurality of advertising devices, respectively based on a predetermined cycle (S410). The extended BLE number estimation apparatus (e.g., the extended BLE number estimation apparatus 200 of FIG. 1) may receive extended advertising data packets and data packets from a data packet acquisition apparatus (e.g., the data packet acquisition apparatus 100 of FIG. 1).

The extended BLE number estimation apparatus may acquire a first candidate value, a second candidate value, and a third candidate value for the number of plural advertising devices based on a first measurement value for the number of extended advertising data packets measured, a second measurement value for the number of data packets measured based on a predetermined cycle, and a third measurement value for the number of advertising devices measured based on a predetermined cycle (S430). In this case, the first candidate value, the second candidate value, and the third candidate value may be plural, and when the first measurement value is the maximum, the plural first candidate values may be equal, when the second measurement value is the maximum, the plural second candidate values may be equal, and when the third measurement value is the maximum, the plural third candidate values may be equal.

The extended BLE number estimation apparatus may acquire information on the number of plural advertising devices based on information on the number of extended advertising data packets, information on the number of data packets, and information on the number of advertising devices related to the first candidate value, information on the number of extended advertising data packets related, information on the number of data packets, and information on the number of advertising devices related to the second candidate value, and information on the number of extended advertising data packets, information on the number of data packets, and information on the number of advertising devices related to the third candidate value (S450).

In an exemplary embodiment, the extended BLE number estimation apparatus may acquire a first summation value based on the information on the number of extended advertising data packets, the information on the number of data packets, and the information on the number of advertising devices related to the first candidate value, the first measurement value, the second measurement value, and the third measurement value, acquire a second summation value based on the number of extended advertising data packets, the information on the number of data packets, and the information on the number of advertising devices related to the second candidate value, the first measurement value, the second measurement value, and the third measurement value, and acquire a third summation based on based on the number of extended advertising data packets, the information on the number of data packets, and the information on the number of advertising devices related to the second candidate value, the first measurement value, the second measurement value, and the third measurement value, and acquire the information on the number of plural advertising devices based on the first summation value, the second summation value, and the third summation value.

Figure 8:
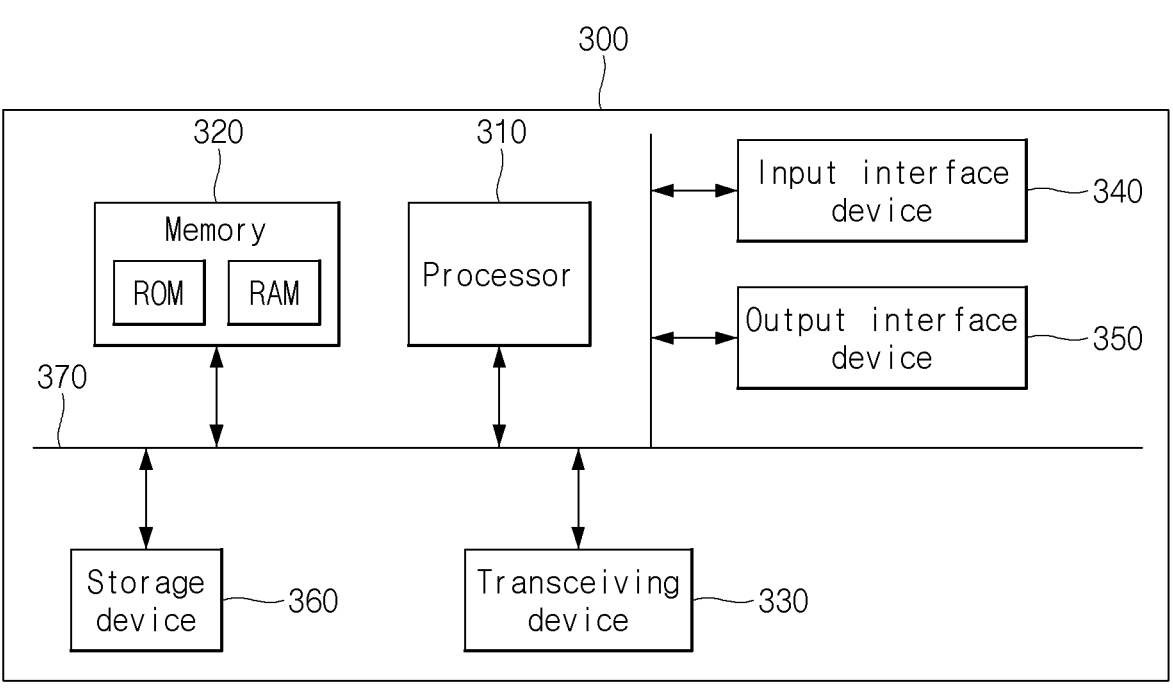
FIG. 8 is a block diagram illustrating an apparatus of estimating the number of extended BLE in an extended

FIG. 8 is a block diagram illustrating an apparatus of estimating the number of extended BLE in an extended neighbor discovery process according to another exemplary embodiment of the present disclosure.

An extended BLE number estimation apparatus 300 of FIG. 8 may be the same as the extended BLE number estimation apparatus 200 of FIG. 1. The extended BLE number estimation apparatus 300 may include at least one processor 310, a memory 320, and a transceiving device 330 connected to a network and performing communication. Further, the extended BLE number estimation apparatus 300 may further include an input interface device 340, an output interface device 350, a storage device 360, etc. Respective components included in the extended BLE number estimation apparatus 300 may be connected by a bus 370 and may perform communication with each other. However, the respective components included in the extended BLE number estimation apparatus 300 may also be connected through an individual interface or an individual bus around the processor 310 other than a common bus 370. However, the processor 310 may also be connected through at least one dedicated interface among the memory 320, the transceiving device 330, the input interface device 340, the output interface device 350, and the storage device 360.

The processor 310 may execute a program command stored in at least one of the memory 320 and the storage device 360. The processor 310 may mean a central processing unit (CPU), a graphics processing unit (GPU), or a dedicated processor performing the methods according to the exemplary embodiments of the present disclosure. Each of the memory 320 and the storage device 360 may be configured as at least one of a volatile storage medium and a non-volatile storage medium. For example, the memory 320 may be configured as at least one of a read only memory (ROM) and a random access memory (RAM).

Most of the terms used in the present disclosure are selected from the general ones that are widely used in the field, but some terms are arbitrarily selected by the applicant and the meaning thereof will be described in detail in the following description as necessary. Accordingly, the present disclosure should be understood based on the intended meaning of the term rather than the mere name or meaning of the term.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

What is claimed is:

1. A method of estimating the number of extended Bluetooth low energy (BLE), the method comprising:

receiving extended advertising data packets and data packets from a plurality of advertising devices, respectively based on a predetermined cycle;

acquiring a first candidate value, a second candidate value, and a third candidate value for the number of plural advertising devices based on a first measurement value for the number of extended advertising data packets measured, a second measurement value for the number of data packets measured based on the predetermined cycle, and a third measurement value for the number of advertising devices measured based on the predetermined cycle; and acquiring information on the number of plural advertising devices based on information on the number of extended advertising data packets, information on the number of data packets, and information on the number of advertising devices related to the first candidate value, information on the number of extended advertising data packets, information on the number of data packets, and information on the number of advertising devices related to the second candidate value, and information on the number of extended advertising data packets, information on the number of data packets, and information on the number of advertising devices related to the third candidate value.

2. The method of claim 1, wherein the first candidate value is plural in number, and when the first measurement value is the maximum, the plurality of first candidate values are equal.

3. The method of claim 1, wherein the second candidate value is plural in number, and when the second measurement value is the maximum, the plurality of second candidate values are equal.

4. The method of claim 1, wherein the third candidate value is plural in number, and when the third measurement value is the maximum, the plurality of third candidate values are equal.

5. The method of claim 1, wherein the acquiring of the information on the number of plural advertising devices includes acquiring the information on the number of extended advertising data packets, the information on the number of data packets, and the information on the number of advertising devices related to the first candidate value, acquiring the information on the number of extended advertising data packets, the information on the number of data packets, and the information on the number of advertising devices related to the second candidate value, and acquiring the information on the number of extended advertising data packets, the information on the number of data packets, and the information on the number of advertising devices related to the third candidate value.

6. The method of claim 5, wherein the acquiring of the information on the number of plural advertising devices includes acquiring a first summation value based on the information on the number of extended advertising data packets, the information on the number of data packets, and the information on the number of advertising devices related to the first candidate value, the first measurement value, the second measurement value, and the third measurement value, acquiring a second summation value based on the information on the number of extended advertising data packets, the information on the number of data packets, and the information on the number of advertising devices related to the second candidate value, the first measurement value, the second measurement value, and the third measurement value, acquiring a third summation value based on the information on the number of extended advertising data packets, the information on the number of data packets, and the information on the number of advertising devices related to the third candidate value, the first measurement value, the second measurement value, and the third measurement value, and acquiring information on the number of plural advertising devices based on the first summation value, the second summation value, and the third summation value.

7. An apparatus of estimating the number of extended Bluetooth low energy (BLE), the apparatus comprising:

a processor; and a memory storing one or more commands performed by the processor, wherein the one or more commands include receiving extended advertising data packets and data packets from a plurality of advertising devices, respectively based on a predetermined cycle;

acquiring a first candidate value, a second candidate value, and a third candidate value for the number of plural advertising devices based on a first measurement value for the number of extended advertising data packets measured, a second measurement value for the number of data packets measured based on the predetermined cycle, and a third measurement value for the number of advertising devices measured based on the predetermined cycle; and acquiring information on the number of plural advertising devices based on information on the number of extended advertising data packets, information on the number of data packets, and information on the number of advertising devices related to the first candidate value, information on the number of extended advertising data packets, information on the number of data packets, and information on the number of advertising devices related to the second candidate value, and information on the number of extended advertising data packets, information on the number of data packets, and information on the number of advertising devices related to the third candidate value.

8. The apparatus of claim 7, wherein the first candidate value is plural in number, and when the first measurement value is the maximum, the plurality of first candidate values are equal.

9. The apparatus of claim 7, wherein the second candidate value is plural in number, and when the second measurement value is the maximum, the plurality of second candidate values are equal.

10. The apparatus of claim 7, wherein the third candidate value is plural in number, and when the third measurement value is the maximum, the plurality of third candidate values are equal.

11. The apparatus of claim 7, wherein the acquiring of the information on the number of plural advertising devices includes acquiring the information on the number of extended advertising data packets, the information on the number of data packets, and the information on the number of advertising devices related to the first candidate value, acquiring the information on the number of extended advertising data packets, the information on the number of data packets, and the information on the number of advertising devices related to the second candidate value, and acquiring the information on the number of extended advertising data packets, the information on the number of data packets, and the information on the number of advertising devices related to the third candidate value.

12. The apparatus of claim 11, wherein the acquiring of the information on the number of plural advertising devices includes acquiring a first summation value based on the information on the number of extended advertising data packets, the information on the number of data packets, and the information on the number of advertising devices related to the first candidate value, the first measurement value, the second measurement value, and the third measurement value, acquiring a second summation value based on the information on the number of extended advertising data packets, the information on the number of data packets, and the information on the number of advertising devices related to the second candidate value, the first measurement value, the second measurement value, and the third measurement value, acquiring a third summation value based on the information on the number of extended advertising data packets, the information on the number of data packets, and the information on the number of advertising devices related to the third candidate value, the first measurement value, the second measurement value, and the third measurement value, and acquiring information on the number of plural advertising devices based on the first summation value, the second summation value, and the third summation value.

13. A system of estimating the number of extended Bluetooth low energy (BLE), the system comprising:

a data package acquisition apparatus acquiring extended advertising data packets and data packets; and an extended BLE number estimation apparatus receiving the extended advertising data packets and the data packets processed by the data packet acquisition apparatus, and estimating the number of plural advertising device, wherein the extended BLE number estimation apparatus receives extended advertising data packets and data packets from a plurality of advertising devices, respectively based on a predetermined cycle, acquires a first candidate value, a second candidate value, and a third candidate value for the number of plural advertising devices based on a first measurement value for the number of extended advertising data packets measured, a second measurement value for the number of data packets measured based on the predetermined cycle, and a third measurement value for the number of advertising devices measured based on the predetermined cycle, and acquires information on the number of plural advertising devices based on information on the number of extended advertising data packets, information on the number of data packets, and information on the number of advertising devices related to the first candidate value, information on the number of extended advertising data packets, information on the number of data packets, and information on the number of advertising devices related to the second candidate value, and information on the number of extended advertising data packets, information on the number of data packets, and information on the number of advertising devices related to the third candidate value.

14. The system of claim 13, wherein when the information on the number of plural advertising devices is acquired, information on the number of extended advertising data packets, information on the number of data packets, and information on the number of advertising devices related to the first candidate value are acquired, information on the number of extended advertising data packets, information on the number of data packets, and information on the number of advertising devices related to the second candidate value are acquired, and information on the number of extended advertising data packets, information on the number of data packets, and information on the number of advertising devices related to the third candidate value are acquired.

15. The system of claim 14, wherein when the information on the number of plural advertising devices is acquired, a first summation value is acquired based on the information on the number of extended advertising data packets, the information on the number of data packets, and the information on the number of advertising devices related to the first candidate value, the first measurement value, the second measurement value, and the third measurement value, a second summation value is acquired based on the number of extended advertising data packets, the information on the number of data packets, and the information on the number of advertising devices related to the second candidate value, the first measurement value, the second measurement value, and the third measurement value, and a third summation is acquired based on based on the number of extended advertising data packets, the information on the number of data packets, and the information on the number of advertising devices related to the second candidate value, the first measurement value, the second measurement value, and the third measurement value, and the information on the number of plural advertising devices is acquired based on the first summation value, the second summation value, and the third summation value.

16. The system of claim 13, wherein the first candidate value is plural in number, and when the first measurement value is the maximum, the plurality of first candidate values are equal.

17. The system of claim 13, wherein the second candidate value is plural in number, and when the second measurement value is the maximum, the plurality of second candidate values are equal.

18. The system of claim 13, wherein the third candidate value is plural in number, and when the third measurement value is the maximum, the plurality of third candidate values are equal.

* * * * *